United States Patent [19]
Dougherty

[11] Patent Number: 5,243,489
[45] Date of Patent: Sep. 7, 1993

[54] PROTECTION CIRCUIT FOR MULTIPLE PHASE POWER SYSTEM

[75] Inventor: John J. Dougherty, Avon, Conn.

[73] Assignee: General Electric Company, New York, N.Y.

[21] Appl. No.: 912,437

[22] Filed: Aug. 21, 1992

Related U.S. Application Data

[63] Continuation of Ser. No. 471,336, Jan. 29, 1990, abandoned.

[51] Int. Cl.$^5$ .............................................. H02H 3/26
[52] U.S. Cl. .................................... 361/93; 361/85
[58] Field of Search ................... 361/76, 77, 85, 86, 361/93

[56] References Cited
U.S. PATENT DOCUMENTS

| | | | |
|---|---|---|---|
| 3,848,160 | 11/1974 | Boothman et al. | 361/86 |
| 4,021,703 | 5/1977 | Gary et al. | 361/85 |
| 4,060,843 | 11/1977 | Bost | 361/76 |
| 4,589,052 | 5/1986 | Dougherty | 361/94 |
| 4,754,247 | 6/1988 | Raymont et al. | 335/202 |
| 4,837,654 | 6/1989 | Chen et al. | 361/93 |

*Primary Examiner*—Todd E. DeBoer
*Attorney, Agent, or Firm*—Richard A. Menelly

[57] ABSTRACT

A protection circuit for three-phase power systems incorporates overcurrent protection along with phase loss and phase imbalance by means of common current sensing transformers. The phase loss and phase imbalance are determined by a pairwise comparison algorithm.

13 Claims, 3 Drawing Sheets

PROTECTION CIRCUIT FOR MULTIPLE PHASE POWER SYSTEM

This is a continuation of U.S. application Ser. No. 07/471,336, filed Jan. 29, 1990 now abandoned.

BACKGROUND OF THE INVENTION

When electric motors are used within three-phase power distribution systems, the motor can become over-heated upon the occurrence of a condition commonly known as "single-phasing". The single-phasing occurs when a fuse in one phase operates to isolate the phase or the wiring within one of the phases becomes other-wise disconnected. The remaining two phases continue to feed the motor causing the motor to over-heat. Although the circuit current increases during the overheating conditions, most circuit interruption devices are not sufficiently sensitive to respond to the increased current resulting in eventual damage to the motor.

Most devices employed to interrupt circuit current upon the occasion of a single-phasing condition require separate sensing devices to measure the voltage across a set of fuses or to measure the current imbalance within the motor itself.

U.S. Pat. No. 4,060,843 discloses separate sensing means coupled to three-phase power lines for determining the occurrence of single-phasing. U.S. Pat. No. 4,021,703 describes the use of a DC ripple detecting device capable of being utilized on a three-phase circuit to detect phase imbalance. U.S. Pat. No. 4,837,654 teaches the use of signal amplifying transistors connected in a serial amplification configuration to detect single-phasing.

One purpose of the instant invention is to describe a circuit capable of detecting both phase loss and phase imbalance without requiring separate sensing devices apart from the current transformers used within electronic overcurrent circuit interruption devices.

SUMMARY OF THE INVENTION

The invention comprises a phase loss and phase imbalance detection circuit employing a plurality of ground referenced operational amplifiers connected with current transformers to provide a trip signal output when the phase loss or phase imbalance is detected. The operational amplifiers are arranged in accordance with a pairwise comparison algorithm and can be used independently from or in combination with standard electronic overcurrent circuit interruption devices.

DESCRIPTION OF THE PREFERRED EMBODIMENT

Figure 1:
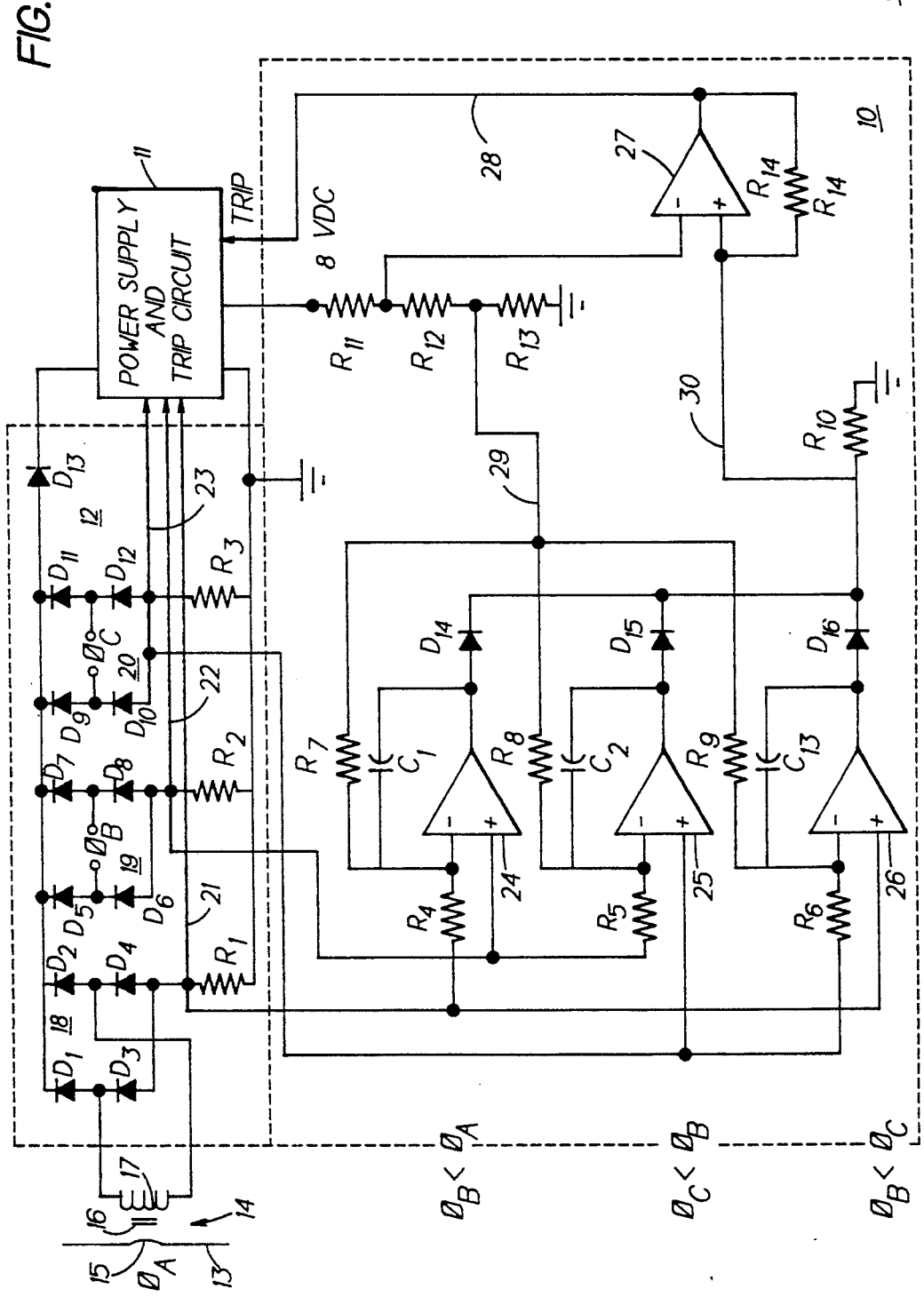
FIG. 1 is a diagrammatic representation of a combined overcurrent, phase imbalance and phase loss protection circuit according to the invention.

An integrated protection circuit 9 is shown in FIG. 1 and includes a phase loss and imbalance detection circuit 10 connected with a power supply and trip circuit 11 and with a signal conditioning circuit 12. The signal conditioning circuit is connected with a three-phase power system, one conductor of which is represented at 13, by means of a current transformer 14 that includes a primary winding 15, core 16, and secondary winding 17. There are three such phase conductors and current transformers although only one phase conductor is shown herein for purposes of illustration. The secondary winding is connected with a bridge rectifier 18 consisting of diodes $D_1-D_4$ and from there to a burden resistor $R_1$ to generate a DC voltage proportional to the current through the first phase conductor. Similar bridge rectifiers 19, 20 and diodes $D_5-D_{12}$ connect with separate burden resistors $R_2$ and $R_3$ and diode $D_{13}$ to provide a voltage indication of the current through the remaining two phase conductors (not shown). The voltage generated across the burden resistors is transmitted to the power supply and trip circuit 11 over conductors 21–23. The trip circuit is similar to that described within U.S. Pat. 4,589,052 entitled "Digital $I^2T$ Pickup, Time bands and Timing Control Circuits for Static Trip Circuit Breakers", which Patent is incorporated herein for purposes of reference. Upon the occurrence of an overcurrent condition in any of the three-phase conductors, a trip signal is generated and the circuit is interrupted in accordance with the teachings of the aforementioned United States Patent. The voltage generated across the burden resistors is also applied to the inputs of three operational amplifiers 24–26 in the following manner. The voltage generated across $R_1$ is applied to the negative input terminal of amplifier 24 through resistor $R_4$ and directly to the positive input terminal of amplifier 26. The voltage appearing across $R_2$ is directly applied to the positive input terminal of amplifier 24 and to the negative input terminal of amplifier 25 through resistor $R_5$. The voltage appearing across $R_3$ is directly applied to the positive input terminal of amplifier 25 and to the negative input terminal of amplifier 26 through resistor $R_6$. The other side of resistors $R_1-R_3$ is connected with the power supply and trip circuit 11 as well as with systems ground. Integration capacitors $C_1-C_3$ are respectively connected across the negative inputs of the operational amplifiers 24–26 and their outputs as indicated. The negative input to operational amplifier 24 is connected through resistor $R_7$ and $R_8$ to the negative input of operational amplifier 25 and through resistor $R_9$ to the negative input of operational amplifier 26. The negative inputs of the three amplifiers are commonly connected to one stage of a voltage divider consisting of resistors $R_{11}-R_{13}$ by means of conductor 29. The outputs of the three operational amplifiers are connected in common through diodes $D_{14}-D_{16}$ and conductor 30 to the positive input terminal of a comparator 27 and commonly connected to ground through resistor $R_{10}$. The negative input to comparator 27 is connected to a second stage of the voltage divider $R_{11}-R_{13}$ to provide a threshold comparison voltage to the comparator. A resistor $R_{14}$ is connected between the positive input to the comparator and the comparator output which connects over conductor 28 to the power supply and trip circuit 11 to provide a trip signal thereto upon the occurrence of a phase loss on phase imbalance condition.

Phase imbalance and phase loss are determined within phase imbalance and the phase loss circuit 10 by means of the following simple pairwise comparison algorithm:

$$PhLoss/Imbalance = B < (A-K) \text{ or } A < (C-K) \text{ or } C < (B-K)$$

where A, B and C are the three phase currents and K is minimum imbalance level, or threshold.

The phase currents A, B, C are represented by the voltages generated across burden resistors $R_1$, $R_2$ and $R_3$ described earlier with respect to the signal conditioning circuit 12. The K factor in the expression for the phase loss algorithm constitutes a setpoint or threshold to prevent spurious and nuisance tripping caused by harmonic variations of a temporary nature unless the imbalance exceeds the setpoint by ten percent, for example. The current in phase B is compared to the current in phase A within the operational amplifier 24 such that the result of the comparison is directed over line 30 to the positive input to comparator 27 which is compared to the threshold value applied to the negative input by the second stage of the voltage divider. In the event that the current in phase B is less than that of phase A by the amount of the threshold value K, a trip signal is generated at the output of the comparator and operates the trip circuit via conductor 28. The current in phase C is compared to the current in phase B within operational amplifier 25 and when the current in phase C is less than that of phase B, a similar trip signal is generated. The current in phase A is compared to the current in phase C within operational amplifier 26 and a similar trip signal is outputted when the current in phase A is less than that of phase C.

Figure 2:
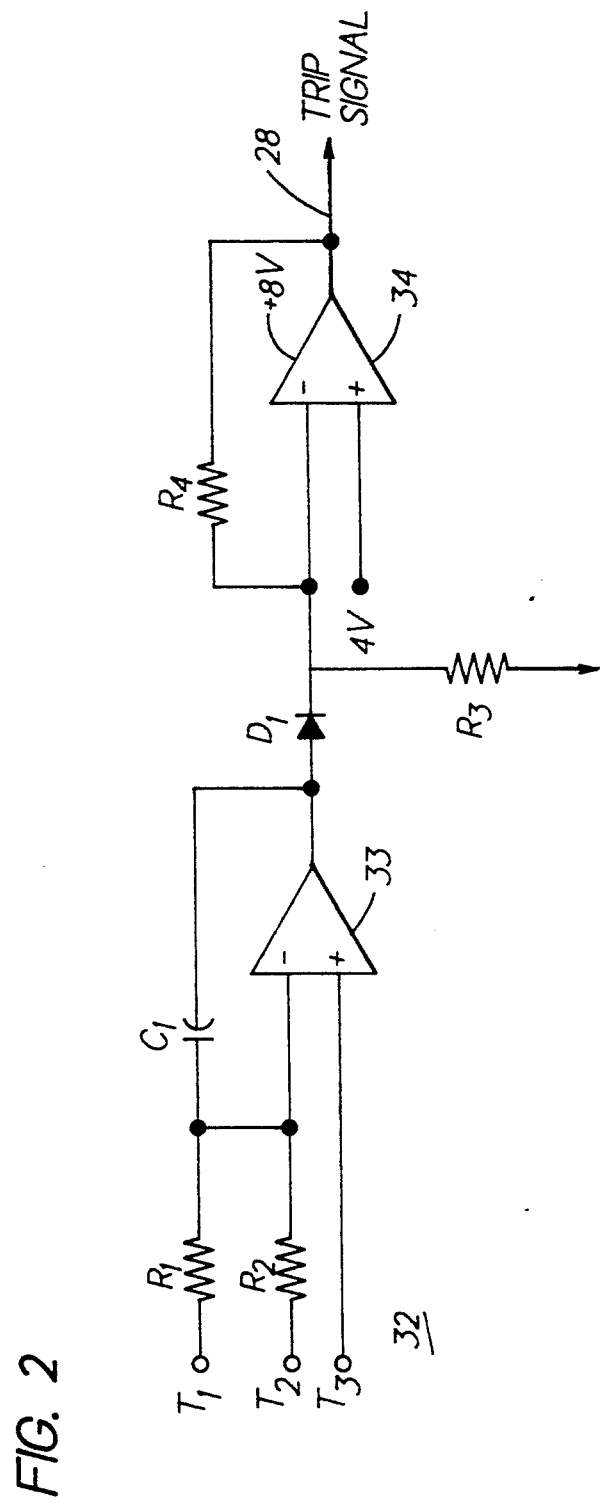
FIG. 2 ia diagrammatic representation of a simplified circuit for detecting phase imbalance and phase loss.

A detailed arrangement of the phase loss and phase imbalance circuit 32 is depicted in FIG. 2 wherein a threshold voltage is applied at $T_1$ and the voltage representing phase A is applied at $T_2$ with the voltage representing phase B applied to $T_3$. In this arrangement the K factor which represents a setpoint or threshold voltage value is applied at the negative input to the ground-referenced operational amplifier 33, configured as an integrator, with the integrating capacitor $C_1$ connecting between the output and the negative input terminal. Resistor $R_1$ represents the voltage value of the K factor whereas the combination of the integrating capacitor $C_1$, less the voltage developed across the input resistor $R_2$, sets the level of imbalance and the short time integration respectively. If desired, both the integrating capacitor and the input resistor can be made variable to set the values over a wide range of operating conditions. RMS or peak detection could also be used to determine the comparison rather than the averaging method determined by means of the operational amplifier 33. In the event that phase A and phase B currents are equal in amplitude, the average signal into the operational amplifier is zero, and the K factor assures a net negative input to the operational amplifier such that the output to the diode $D_1$ remains at ground value via resistor $R_3$. When the net voltage value of phase A exceeds the average of the phase B voltage plus the K factor, the output ramps in the positive direction and provides an input to the second comparator 34 where it is compared to a four volt reference supplied to the negative terminal. If it exceeds the four volt reference voltage, a trip signal is outputted onto the trip line 28.

Figure 3:
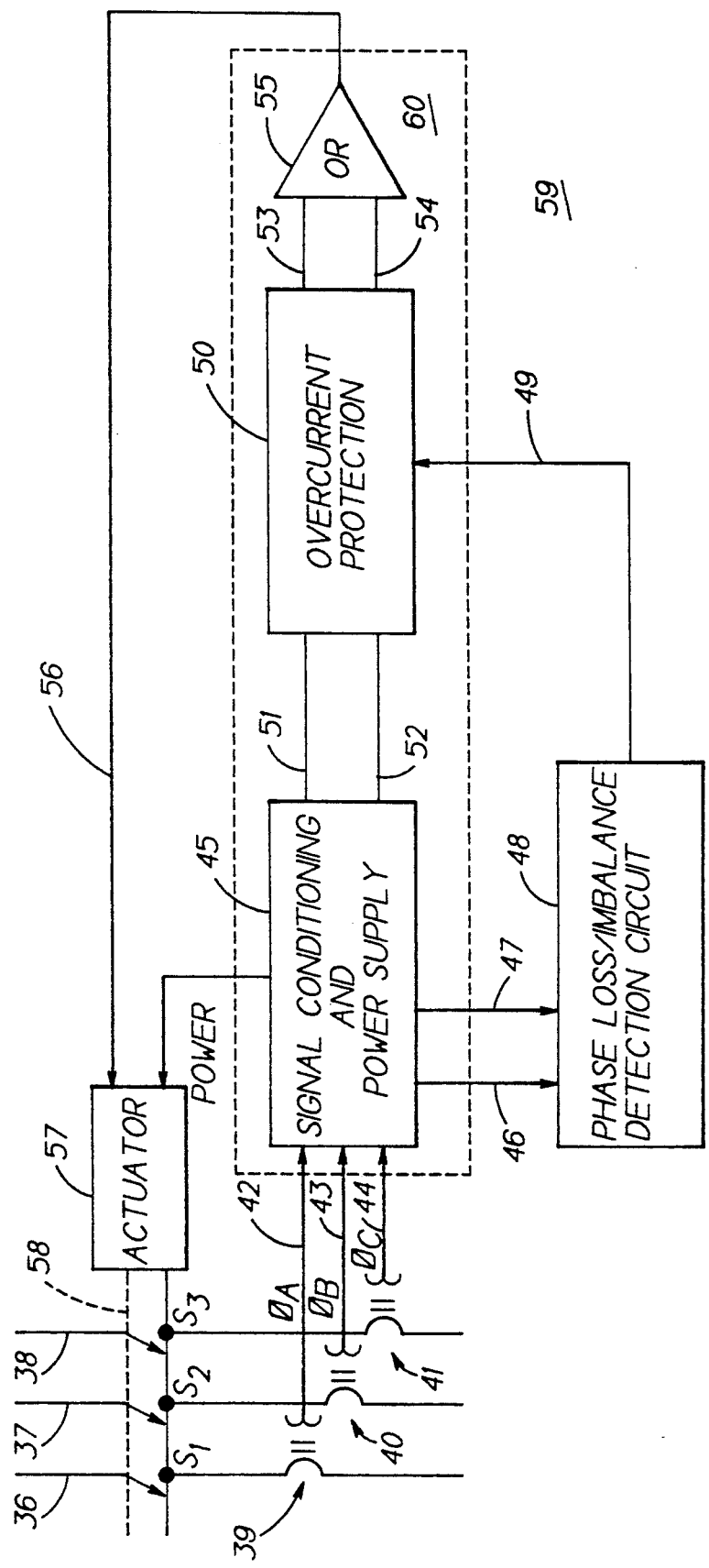
FIG. 3 is a schematic representation of a circuit interruption circuit including an add-on modular phase loss and phase imbalance accessory in accordance with an alternative embodiment of the circuit of FIG. 1.

A combined overcurrent protection, phase loss and phase imbalance circuit 59 is depicted in FIG. 3 wherein the phase loss and phase imbalance circuit 48 comprises a stand-alone module which is plugged into the signal conditioning and power supply circuit 45 and the overcurrent trip circuit 50. The signal conditioning and power supply circuit 45 as well as the trip circuit 50 are all included within the circuit breaker trip unit described in U.S. Pat. No. 4,754,247 entitled "Molded Case Circuit Breaker Accessory Enclosure", which Patent is incorporated herein for purposes of reference. In the circuit breaker described in this Patent, the trip unit 60 and the actuator 57 are arranged within the circuit breaker case and are accessible through an accessory cover. It is contemplated that the phase loss and phase imbalance circuit 4 could be arranged in a separate recess within the circuit breaker cover and provided as an add-on accessory. In this arrangement, the three phases of a three-phase power circuit comprising conductors 36, 37 and 38 are protected by means of the circuit breaker contacts represented as switches $S_1$-$S_3$ within each of the separate phases. Current transformers 39-41 connect with the signal conditioning and power supply 45 over conductors 42-44 to provide signals to the trip circuit 50 over conductors 51, 52 for overcurrent determination. The same representative voltage signals are inputted to the phase loss and phase imbalance circuit 48 over conductors 46 and 47. When a phase loss or imbalance condition is ascertained, an output signal is provided to the trip circuit 50 over conductor 49. The output of the overcurrent determination from the trip circuit is inputted over conductor 53 to OR GATE 55. The output from the trip unit relative to the presence of a phase loss or phase imbalance condition is inputted to the OR GATE over conductor 54. Upon the occurrence of either an overcurrent condition or a phase loss or a phase imbalance condition, a trip signal is applied over conductor 56 to the actuator unit 57. The actuator then interrupts the current through all three conductors 36-38 by means of the operative connection between the actuator and switches $S_1$-$S_3$ as indicated by the control line 58.

A simple phase loss and phase imbalance circuit has herein been described as a stand-alone circuit, an integral part of an overcurrent protection circuit as well as in the form of an add-on accessory to existing circuit breakers. The phase loss and phase imbalance circuit implements an algorithm that determines the occurrence of a phase loss or phase imbalance condition and outputs a trip signal to interrupt all three phases of a protected three-phase power supply.

Having thus described my invention, what I claim as new and desire to secure by Letters Patent is:

1. A circuit interrupter including phase loss, phase imbalance and overcurrent circuit protection comprising:

a plurality of current transformers connecting with corresponding phases of a multi-phase power system, each of said current transformers providing a value representative of current flow through each of said corresponding phases of said multi-phase power system;

a plurality of rectifiers and resistors connecting with said current transformers for generating DC voltage representations of circuit current through each of said phases;

a trip circuit connected with said current transformers for providing operating power to said trip circuit and with said resistors for determining overcurrent conditions through said phases and interrupting circuit current through said phases when said overcurrent conditions persist for a predetermined time;

a plurality of amplifiers interconnected together and connected with said resistors and said trip circuit to determine phase imbalance between said phases and input a trip signal to said trip unit upon occurrence of said phase imbalance above a predetermined threshold; and a trip actuator unit connecting with said trip circuit and with a plurality of separable contacts to interrupt said circuit current upon occurrence of said overcurrent condition or said phase imbalance, said trip circuit, said actuator, said resistors, said amplifiers and said rectifiers being collectively contained within a common enclosure.

2. The circuit interrupter of claim 1 including a comparator connecting between said amplifiers and said trip circuit for determining whether said phase imbalance exceeds said threshold.

3. The circuit interrupter of claim 2 wherein said amplifiers have corresponding outputs connected in common with one input to said comparator.

4. The circuit interrupter of claim 3 wherein said amplifiers have corresponding inputs connected in common with each other and with another input on said comparator.

5. The circuit interrupter of claim 4 wherein said inputs are connected with another input through a voltage divider network.

6. The circuit of claim 5 wherein said one input connects with said comparator output through a feedback resistor.

7. The circuit interrupter of claim 1 wherein aid resistors, said amplifiers and said rectifiers are removably arranged within said common enclosure.

8. The circuit interrupter of claim 1 wherein said trip circuit connects with said actuator through an OR gate.

9. The circuit interrupter of claim 1 wherein said amplifiers include a commonly-connected output, said commonly-connected output being connected to one side of a summing resistor for providing a voltage representation of said phases and said commonly-connected input being connected with a voltage divider for providing said threshold.

10. An improved circuit interrupter of the type consisting of a case and a cover, said case including means for interrupting circuit current through a protected circuit, said cover including recess means for accepting an accessory device, wherein the improvement comprises:

an overcurrent protection tip circuit for determining overcurrent conditions within three phases of a multi-phase power circuit and activating said interrupter means when said overcurrent condition persists for a predetermined period of time;

a phase imbalance accessory device within said recess, said device including circuit means for determining a phase imbalance within said multi-base power circuit and providing an interrupt signal to said interruption means to interrupt said circuit current.

11. The circuit interrupter of claim 10 including a comparator connected with said overcurrent protection trip circuit and said phase imbalance circuit means to output a trip signal to said interrupter means when either an overcurrent condition or a phase imbalance condition is detected on aid multi-phase power circuit.

12. The circuit of claim 10 including a current transformer within each of said three phases for sampling circuit current and contacts within each of said phases, said contact responding to said interruption means to interrupt said circuit current.

13. The circuit of claim 10 wherein said phase imbalance protection device is arranged within a module removably connectable with said current transformers and said overcurrent protection circuit.

* * * * *